US008458669B2

(12) United States Patent
Glowaty

(10) Patent No.: US 8,458,669 B2
(45) Date of Patent: Jun. 4, 2013

(54) AUTOMATED TEST SYSTEM

(75) Inventor: Grzegorz Glowaty, Przemysl (PL)

(73) Assignee: International Business Machines Corporation, Armonk, NY (US)

( * ) Notice: Subject to any disclaimer, the term of this patent is extended or adjusted under 35 U.S.C. 154(b) by 1239 days.

(21) Appl. No.: 12/261,513

(22) Filed: Oct. 30, 2008

(65) Prior Publication Data

US 2009/0119055 A1    May 7, 2009

(30) Foreign Application Priority Data

Nov. 2, 2007   (EP) .................................... 17119849

(51) Int. Cl.
    *G06F 9/44* (2006.01)
(52) U.S. Cl.
    USPC ......................................................... 717/129
(58) Field of Classification Search
    USPC ......................................................... 717/129
    See application file for complete search history.

(56) References Cited

U.S. PATENT DOCUMENTS

| | | | |
|---|---|---|---|
| 5,021,997 A | 6/1991 | Archie et al. | |
| 6,331,957 B1 * | 12/2001 | Kurts et al. | 712/227 |
| 6,708,324 B1 | 3/2004 | Solloway et al. | |
| 6,751,751 B1 * | 6/2004 | Murray et al. | 714/34 |
| 7,334,162 B1 * | 2/2008 | Vakrat et al. | 717/124 |
| 7,447,942 B2 * | 11/2008 | Chen et al. | 717/124 |
| 7,552,425 B2 * | 6/2009 | Bates et al. | 717/129 |
| 7,840,947 B2 * | 11/2010 | Lev et al. | 717/124 |
| 7,865,704 B2 * | 1/2011 | Moyer | 717/129 |
| 7,992,133 B1 * | 8/2011 | Theroux et al. | 717/124 |
| 8,015,553 B2 * | 9/2011 | Jung et al. | 717/127 |
| 2004/0181781 A1 * | 9/2004 | Tohdo et al. | 717/124 |
| 2005/0114839 A1 * | 5/2005 | Blumenthal et al. | 717/124 |
| 2008/0209441 A1 * | 8/2008 | Septon et al. | 719/318 |

OTHER PUBLICATIONS

Miller et al., "Breakpoints and Halting in Distributed Programs", 1988, IEEE.*
Spezialetti et al. "Debugging Distributed Programs through the Detection of Simultaneous Events", 1994, IEEE.*
Haban et al. "Global Events and Global Breakpoints in Distributed Systems", 1988, IEEE.*

* cited by examiner

*Primary Examiner* — Wei Zhen
*Assistant Examiner* — Junchun Wu
(74) *Attorney, Agent, or Firm* — Francis Lammes; Stephen J. Walder, Jr.; Libby Z. Toub

(57) ABSTRACT

A mechanism is provide for optimizing an automated test system during a problem determination phase of the test system in a distributed environment. A centralized execution controller receives first test suite comprising at least a first and second test fragment. The centralized execution controller receives at least one breakpoint definition comprising a condition for pausing the first test suite. The centralized execution controller sends the first test fragment and an execution command of the first test fragment to the distributed environment. The centralized execution controller receives an event definition and a hierarchy of event definitions describing the executed command. The centralized execution controller compares the at least one breakpoint description to the received event definition. The centralized execution controller pauses the test suite execution if the executed event definition matches one of the at least one breakpoint definition.

17 Claims, 3 Drawing Sheets

AUTOMATED TEST SYSTEM

TECHNICAL FIELD

Figure 1:
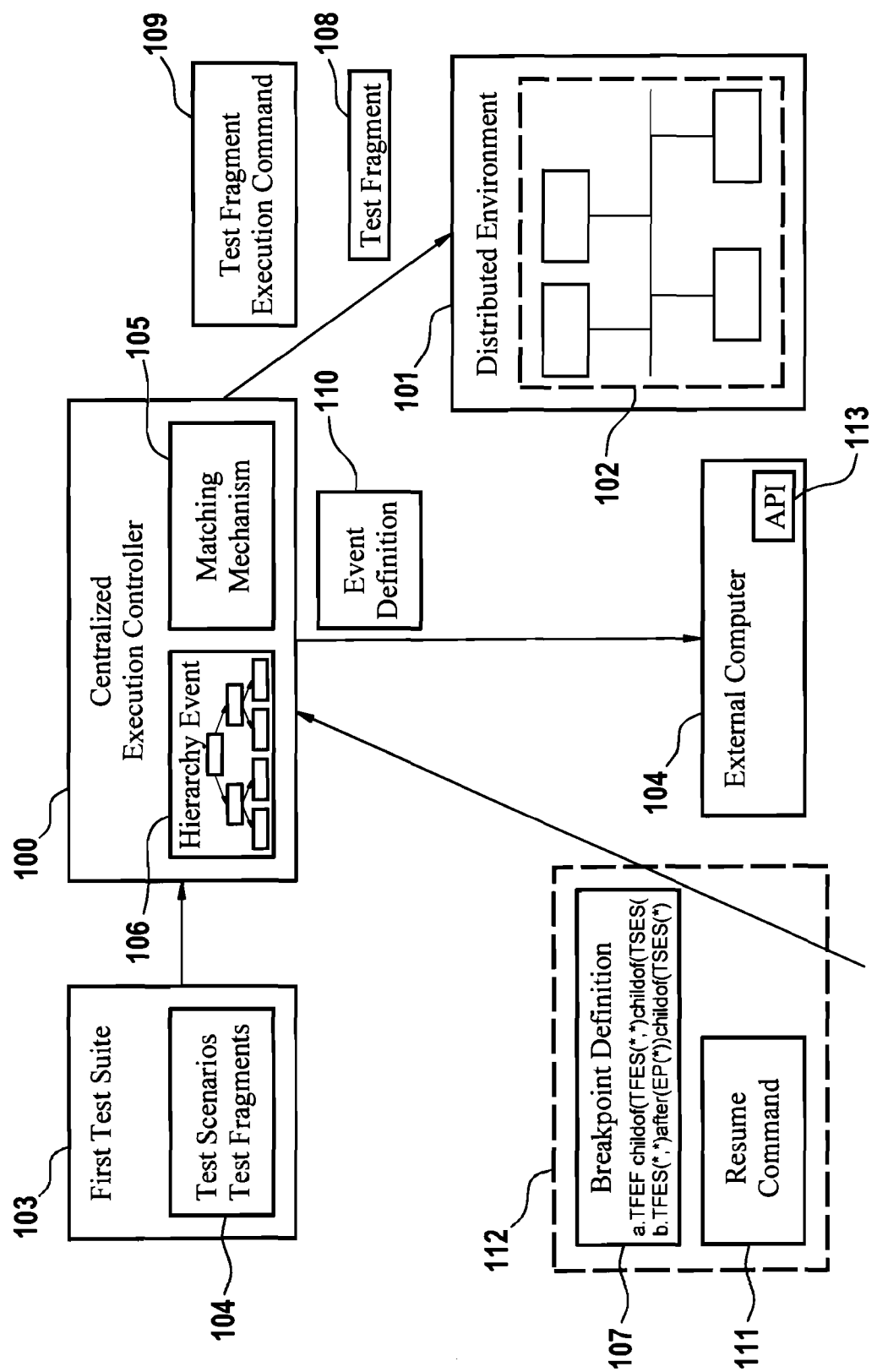

The invention relates to an automated test system, to a method and to a computer program product.

BACKGROUND

Development of fully automated tests allows a great cost reduction in the test execution phase. It is essential to have test suites fully or almost fully automated in order to successfully test any large-scale product. However, many test scenarios for distributed environments require a big effort to be developed in fully automated fashion. In many cases the saving could be gained by having a majority of scenarios easily automated and minor percentage of additional tests executed manually. Another common problem with test automation is the problem determination phase. Once the automated tests suites are executed, the only information available to the developer are very often the logs collected during the test execution phase.

There is therefore a need for a method of optimizing an automated test system during the problem determination phase of the test system, a computer program product and a centralized execution controller adapted to perform the method in accordance with the invention.

BRIEF SUMMARY

The illustrative embodiments optimize an automated test system during a problem determination phase of the test system in a distributed environment with a plurality of local computers and a plurality of remote computers. The illustrative embodiments receive a test suite by a centralized execution controller. In the illustrative embodiments the test suite comprises a first test fragment and a second test fragment. The illustrative embodiments receive at least one breakpoint definition comprising a condition for pausing the test suite by the centralized execution controller. The illustrative embodiments send the first test fragment and an execution command of the first test fragment from the centralized execution controller to a distributed environment. The illustrative embodiments receive at least one event definition from a plurality of event definitions and a hierarchy of event definitions describing a result of the execution command by the centralized execution controller. The illustrative embodiments compare the at least one breakpoint definition with the at least one event definition by a matching mechanism coupled to the centralized execution controller. The illustrative embodiments pause the test suite if the at lease one event definition matches the at least one breakpoint definition by the centralized execution controller.

In other illustrative embodiments, a computer program product comprising computer executable instructions embodied on a computer readable program is provided. The computer readable program, when executed on a computing device, causes the computing device to perform various ones, and combinations of, the operations outlined above with regard to the method illustrative embodiment.

In yet another illustrative embodiment, a centralized execution controller provided. The centralized execution controller further comprises means for performing various ones, and combinations of, the operations outlined above with regard to the method illustrative embodiment.

BRIEF DESCRIPTION OF THE OF THE SEVERAL VIEWS OF THE DRAWINGS

Figure 2:
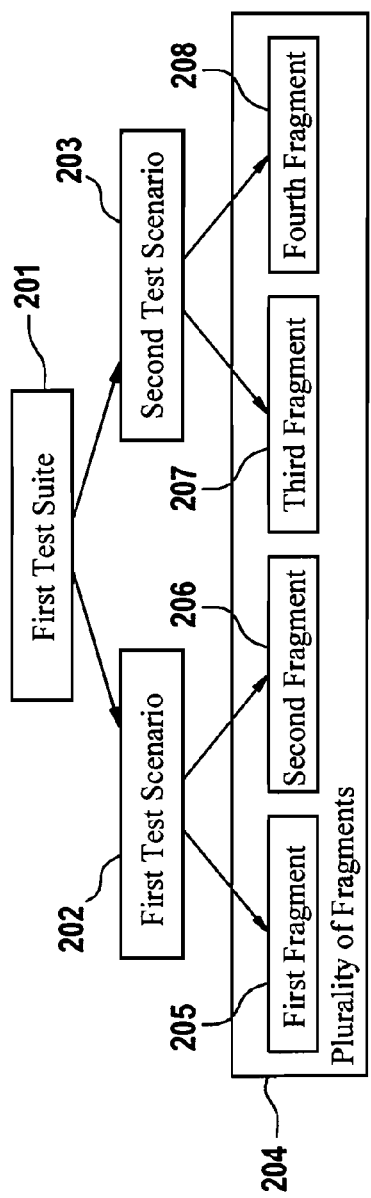
Figure 3:
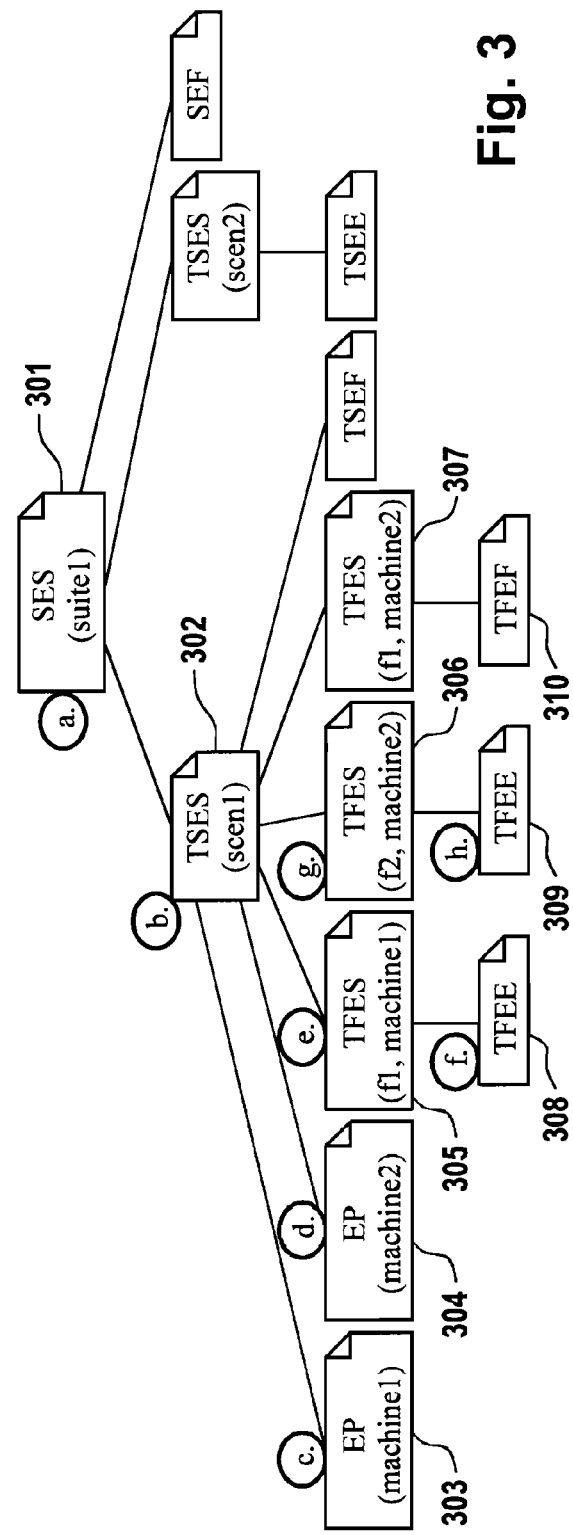
Figure 4:
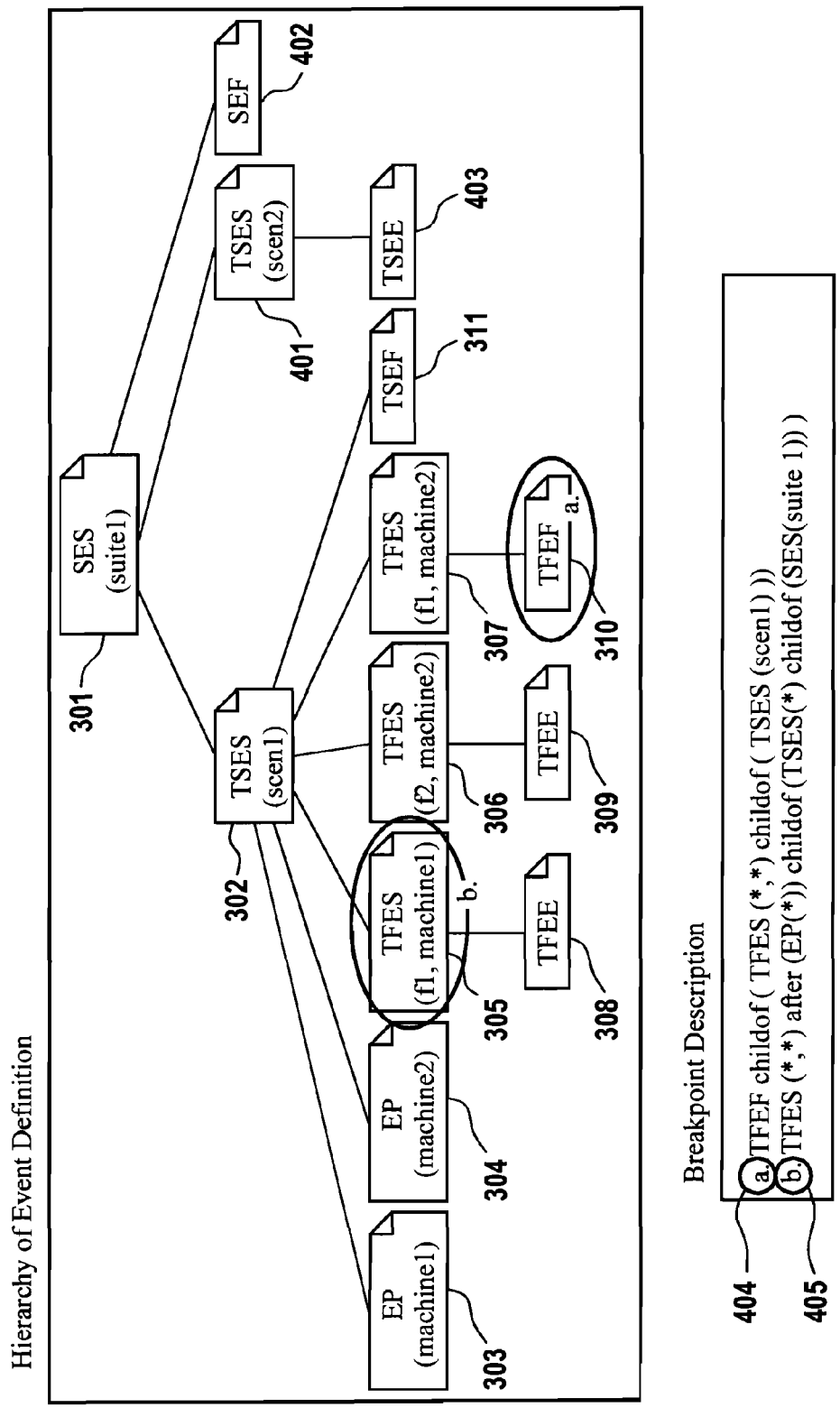

In the following preferred embodiments of the invention will be described in greater detail by way of example only making reference to the drawings in which:

FIG. 1 is a block diagram of an automated test system in accordance with a first preferred embodiment of the invention, FIG. 2 is a block diagram illustrating a preferred embodiment of a method of the invention, FIG. 3 is a block diagram illustrating a second preferred embodiment of a method of the invention, and FIG. 4 is a block diagram illustrating a third preferred embodiment of a method of the invention,

DETAILED DESCRIPTION

FIG. 1 shows a block diagram of an automated test system that includes a centralized execution controller 100, a distributed environment 101 that includes a plurality of local and remote computers 102, a first test suite 103 and at least an external computer 104. The first test suite 103 further comprises a description of test scenarios and test fragments 104, the centralized execution controller 100 is coupled to a matching mechanism 105 and generates a hierarchy event 106.

When starting the test system, the centralized execution controller receives a description of the first test suite 103 that includes a description of test scenarios and test fragments 104. The centralized execution controller 100 also receives at least one break point definition 107 that describes a condition on pausing the test suite execution. This breakpoint definition 107 may be sent by an external computer and may be an input from a user using an application program interface (API). The breakpoint definition 107 may be a plurality of breakpoints and may be received by the centralized controller 100 at any time of the test suite execution 103. The controller 100 then starts the execution of the test suite 103 and sends test fragments 108 to the distributed environment and execution commands 109. During the execution, the controller 100 generates event definitions 110 corresponding to the executed commands 109 and, if required, may send the event definition 110 to at least an external computer 104. This at least external computer 104 may be the same source that send the breakpoint definitions 107. The external computer may start a request to receive the stream of event definitions 110 at any time during the test suite execution 103, so that the controller 100 may first send an stream of all event definitions 110 that were generated in the past and may also receive in real time the current event definitions.

During the test suite execution, the controller 100 or an external entity coupled to the controller 100 generate a hierarchy or tree of events 106 that may be visualized on application program interface in at least the external computer 104. The controller 100 or an external entity continuously compare the generated event definitions 110 and the breakpoint definitions 107 and pauses the test suite execution when a match between the events 110 and the breakpoints 107 has been found. A user may start collecting logs of the distributed environment or initiate a deep analysis of the environment or machine state. This step may be called the problem determination phase. When this phase has been completed, the user may send a resume command 111 of the test suite to the execution controller 100. The command may be sent using a debugger port.

One of the advantages of the invention is that it allows automatically pausing the system when a failure during the test has been detected, so that a user, a tester or an automated tool can look at the content of all the files and the machine or network status that otherwise would not be available during the log collection phase. This allows a great advantage during the problem determination phase, as it gives a great detail of information of the environment at the moment that the failure has occurred.

Another advantage of the invention is that automating a distributed environment allows a great saving of time and effort, as a single execution controller sends all the initiation preparation, starting and ending of the fragment of test that requires to be executed in the local or remote computers. This same controller may include a comparison mechanism to analyze the pausing conditions and execute the commands when necessary, without modifying the scripts that execute the tests and allowing flexible introduction of new breakpoints at any time of the test execution.

FIG. 2 shows a block diagram of an automated test system according to the invention. FIG. 2 comprises a first test suite 201, a first and a second test scenario 202, 203 in a lower hierarchy as the first test suite 201. The first test scenario 202 comprises a first and a second test fragment 205, 206 and second test scenario 203 comprises a third and a fourth test fragment 207, 208. The first test suite 201 represents a set of one or more test scenarios to be executed and is the highest instance within the automated test system. The test suite scenarios as the first and second test scenario 202, 203 describes distributed interactions of one or more software components deployed on one or more physical machines.

The interaction is provided in the form of a computer program with an output, the fundamental programming element of the test suite scenarios is the test fragment. Each of the plurality of test fragments 204, as those from 204-207, represent a single unit of functionality to be executed as part of the test scenario. Each of the plurality of test fragments 204 can be designated to run on a particular machine in the distributed environment. The test fragment represents the logical functions that need to be executed to complete the test suite scenario. The test fragment may be described based on the machine and the code to be executed.

FIG. 3 shows a block diagram of an automated test system and the traversal mode sequence to execute the distributed test suites in a pre-order mode. FIG. 3 shows the suite execution start of the suite1 301, the test suite scenario execution start (TSES) of the scenario 1 302, belonging to the suite execution start 301. The TSES of scenario 1 (302) has a subset of: Environment Preparation of the machine 1 (303), Environment Preparation of the machine 2 (304), the Test Fragment Execution Start (TFES) of a function 1 into machine 1 (305), a Test Fragment Execution Start (TFES) of the function 2 into a machine 2 (306) and a Test Fragment Execution Start (TFES) of the function 1 into the machine 2 (307). A further subsets of these Test Fragments are a result of Test Fragment Execution End (TFEE) 308 being a child of TFES 305. A Test Fragment Execution End 309 is a result of TFES 306 and finally a Test Fragment Execution Failure 310 is a result of TFES 307. Traversing this tree in pre-order mode reflects the execution chronology, using a traversal mode on a preordered sequence.

FIG. 3 shows an example of this sequence with an execution order from "a" to "h". The first step of the Suite Execution start SES on suite1 (301) is read and executed. This SES 301 further comprises or contains a Test Suite Scenario Execution start of a scenario1 (302). The next sequence to be executed belongs to the next hierarchy of the TFES 302 on the left side, which corresponds to the Execution Preparation EP of the machine1 (303). When the execution preparation on the machine1 has been completed, the second event definition to be executed corresponds to the Execution Preparation EP of the machine2 (304). When the execution preparation on machine2 has been completed and as EP of machine2 has no child of the event, the next event to be executed corresponds to the Test Fragment Execution start from a function1 into machine1 (305). The child of the result of this test fragment 305 is represented as the Test Fragment Execution End TFEE 308. End events have no attributes and are always considered children of another event.

The following event definition to be executed belongs to the start of a test fragment execution TFES of function2 into machine2 (306). The result of this TFES 306 is represented as the child in the end of the test fragment execution TFEE 309. The start of the test fragment execution TFES into machine2 and running function1 (307) is the next element executed. TFES has as a child the failure of the test fragment execution TFEE (310). As it can be seen in this figure, the sequence starts from the top of the hierarchy going down to the most left child. Subsequent child event definitions are executed until the definition has no more children. Then, the algorithm returns to the next higher level and executes the next event definition to the right until all the event definitions have been executed. One of the advantages of the invention is that the event definitions are described in a high-level language of the language used to write the test scripts. This language allows defining the breakpoint descriptions based on the location, type of function or identification of the event definitions within the hierarchy of event definitions.

FIG. 4 represents an optimized test system according to the invention and the break point description based on an event definition condition. The elements in the embodiment shown in FIG. 4 that corresponds to elements of the embodiment of FIG. 3 have been designated by the same reference signals. The hierarchy of the event definition further comprises the start of the test suite execution TSES into scenario2 (401) as a child of Suite Execution Start SES of suite1 (301), the failure of a suite execution SEF 402 as a child of the same SES of suite1 (301) and the end of a test suite execution TSEE (403) as a child of TSES of scen2 (401).

One of the advantages of the is to be able to intercept every single step in the test suite execution with the formulation of a break point in a high level language above any script language written to execute the tests. There is no need to plan the pause of the test execution during the test writing phase and the breakpoints may be defined after a first identification of the problem or failure. The invention allows an easy implementation of breakpoints in a distribute environment and across a plurality of local or remote computers.

For example, during the problem determination case, a user or an automated tool may consider the pause of a test execution after the failure of a given test scenario fragment TFEF. The user may then go to the machine on which the fragment failed and initiate the problem determination phase or analyze the neighbour's computers, network traffic or the software environment that may be affecting the system. If the break point defines the failure of a test fragment execution TFEF as the child of any test fragment execution on any machine (noted as (*,*) where the first parameter is the identification of a test scenario fragment, the second is the identification of the machine) of a test fragment execution TFES, then the identification of the event definition may be easily located on FIG. 4. To narrow even further the break point description, the TFES (*,*) is a child of the start of the test suite execution TSES of scenario1.

Following the syntax as described in FIG. 4 and with the hierarchy information of the event definition, the matching mechanism easily identifies the condition that in this case corresponds to the TFEF 310. This breakpoint description corresponds to the syntax: TFEF childof (TFES(*,*) childof (TSES (scen1))). If the hierarchy is analyzed from the top to the bottom, then the breakpoint is found on a child of TSES of scen1 that corresponds to any function or machine of a TFES (*,*). In this case there are three possibilities: TFES(f1,machine1), TFES(f2,machine2) or TFES(f1,machine2). The breakpoint is defined as a TFEF that is a child of any of these three TFES. This can only correspond to the TFEF 319.

The next break point to be identified 405, is described by the syntax of the break point description as: TFES (*,*) after (EP(*)) childof (TSES(*) childof (SES(suite1))). One of the matching mechanisms may interpret the syntax in the following manner: The TFES corresponds to any scenario fragment executed on any machine. The TFES comes after the execution of an Environment preparation EP into any machine. The TFES (*,*) is as well a child of a TSES executed into any scenario. This TSES is a child of the SES into suite1. In the hierarchy of event definition of FIG. 4, this matches with the event definition TFES(f1, machine1) 305. This breakpoint description pauses the test system into any event definition that matches these characteristics and therefore represents an advantage of the invention for test systems executed on a distributed environment having a plurality of local and remote computers.

The general grammar expressed to describe the breakpoint description may use the following syntax:
BREAKPOINT ::=EVENT_DESC
EVENT_DESC ::=EVENT PREV_EVENT_ELEMENT PARENT_EVENT_LIST As a general rule, the first element (EVENT) represents the event definition where the matching mechanism compares the breakpoint description to try to find the pausing condition. The event may be any of the suite execution start SES, end SEE or failure SEF; by the test scenario execution start TSES, end TSEE, failure TSEF; by the environment preparation EP, environment clean up EC; or by the test fragment execution start TFES, end TEEE or failure TEEF. Another possible events are: paused test execution and resumed test execution. More events may be defined according to the type of test system to be executed. In the example 405, the event corresponds to any TFES(*,*). The event definitions may be further defined using a string of alphanumeric characters, a machine or function identification where the test is being executed, or some other parameter to identify the location or type of test.

The previous event element (PREV_EVENT_ELEMENT) describes the event definition that was executed before the EVENT. The PREV_EVENT_ELEMENT may be then uses the syntax:
PREV_EVENT_ELEMENT ::=after (EVENT_DESC ).
This syntax in the example 405 was described by "after (EP(*))". This represented all the event definitions that were executed after any Environment Preparation. The third element of the breakpoint description is formed by the PARENT_EVENT_LIST that describes the parent of the EVENT. This may be represented in the syntax as:
PARENT_EVENT_LIST ::=childof (EVENT_DESC ).
The syntax describes the event description as a child of a determined event definition. In the example 405, the TFES (*,*) is a child of TSES(*).

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method of optimizing an automated test system during a problem determination phase of the test system in a distributed environment with a plurality of local computers and a plurality of remote computers, the method comprising:
receiving a test suite by a centralized execution controller, wherein the test suite comprises a first test fragment and a second test fragment;
receiving at least one breakpoint definition comprising condition for pausing the test suite by the centralized execution controller;
sending the first test fragment and an execution command of the first test fragment from the centralized execution controller to the distributed environment;
receiving at least one event definition from a plurality of event definitions and a hierarchy of event definitions describing a result of the execution command by the centralized execution controller, wherein the at least one event definition, specifies at least one of: a start or an end, a test scenario execution or test fragment execution, an environment preparation or environment cleanup, or a paused test execution or resumed test execution;
comparing the at least one breakpoint definition with the at least one event definition by a matching mechanism coupled to the centralized execution controller; and
pausing the test suite if the at least one event definition matches the at least one breakpoint definition by the centralized execution controller.

2. The method of claim 1, further comprising:
receiving a resume command of the test suite from an external computer coupled to the centralized execution controller after the problem determination phase by the centralized execution controller completes execution.

3. The method of claim 1, wherein the test suite further comprises: at least a first test scenario in the distributed environment, wherein the first test scenario describes the first test fragment and the second test fragment, wherein the first test fragment and the second test fragment are executed on at least one of the plurality of local computers or the plurality of remote computers, wherein the plurality of event definitions describe the result of the execution command in the test suite.

4. The method of claim 2, wherein test suite control information is sent using an application programming interface , wherein the test suite control information comprises at least one of: the at least one breakpoint definition, a pausing command, or the resume command for the test suite.

5. The method of claim 2, further comprising:
streaming, in real time and in a pre-order mode of the hierarchy of event definitions, the at least one event definition to the external computer.

6. The method of claim 2, wherein the external computer comprises an application program interface for introducing test suite control information.

7. A computer program product comprising computer executable instructions embodied in a computer readable program stored on a non-transitory computer readable storage medium, wherein the computer readable program, when executed on a computing device, causes the computing device to:
receive a test suite by a centralized execution controller, wherein the test suite comprises a first lest fragment and a second test fragment;

receive at least one breakpoint definition comprising a condition for pausing the test suite by the centralized execution controller;

send the first test fragment and an execution command of the first test fragment from the centralized execution controller to a distributed environment;

receive at least one event definition from a plurality of event definitions and a hierarchy of event definitions describing a result of the execution command by the centralized execution controller, wherein the at least one event definition specifies at least one of: a start or an end, a test scenario execution or test fragment execution, an environment preparation or environment cleanup, or a paused test execution or resumed test execution;

compare the at least one breakpoint definition with the at least one event definition by a matching mechanism coupled to the centralized execution controller; and pause the test suite if the at least one event definition matches the at least one breakpoint definition by the centralized execution controller.

8. A centralized execution controller comprising:

processor; and a memory coupled to the processor, wherein the memory comprises instructions which, when executed by the processor, cause the processor to:

receive a test suite by a centralized execution controller, wherein the test suite comprises a first test fragment and second test fragment;

receive at least one breakpoint definition comprising a condition for pausing the test suite by the centralized execution controller;

send the first test fragment and an execution command of the first test fragment from the centralized execution controller to a distributed environment;

receive at least one event definition from a plurality of event definitions and a hierarchy of event definitions describing a result of the execution command by the centralized execution controller, wherein the at least one event definition specifies at least one of: a start or an end, a test scenario execution or test fragment execution, an environment preparation or environment cleanup, or a paused test execution or resumed test execution;

compare the at least one breakpoint definition, with the at least one event definition by a matching mechanism coupled to the centralized execution controller; and pause the test suite if the at least one event definition matches the at least one breakpoint definition by the centralized execution controller.

9. The centralized execution controller of claim 8, wherein the instructions further cause the processor to:

receive a resume command of the test suite from an external computer coupled to the centralized execution controller after a problem determination phase by the centralized execution controller completes execution.

10. The computer program product of claim 7, wherein the computer readable program further causes the computing device to;

receive a resume command of the test suite from an external computer coupled to the centralized execution controller after the problem determination phase by the centralized execution controller completes execution.

11. The computer program product of claim 7, wherein the test suite further comprises: at least a first test scenario in the distributed environment, wherein the first test scenario describes the first test fragment and the second test fragment, wherein the first test fragment and the second test fragment are executed on at least one of a plurality of local computers or a plurality of remote computers, wherein the plurality of event definitions describe the result of the execution command in the test suite.

12. The computer program product of claim 10, wherein test suite control information is sent using an application programming interface, wherein the test suite control information comprises at least one of: the at least one breakpoint definition, a pausing command, or the resume command for the test suite.

13. The computer program product of claim 10, wherein the computer readable program further causes the computing device to:

stream, in real time and in a pre-order mode of the hierarchy of event definitions, the at least one event definition to the external computer.

14. The computer program product of claim 10, wherein the external computer comprises an application program interface for introducing test suite control information.

15. The centralized execution controller of claim 8, wherein the test suite further comprises: at least a first test scenario in the distributed environment, wherein the first test scenario describes the first test fragment and the second test fragment, wherein the first test fragment and the second test fragment are executed on at least one of a plurality of local computers or a plurality of remote computers, wherein the plurality of event definitions describe the result of the execution command in the test suite.

16. The centralized execution controller of claim 9, wherein test suite control information is sent using an application programming interface, wherein the test suite control information comprises at least one of: the at least one breakpoint definition, a pausing command, or the resume command for the test suite.

17. The centralized execution controller of claim 9, wherein the instructions further cause the processor to:

stream, in real time and in a pre-order mode of the hierarchy of event definitions, the at least one event definition to the external computer.

* * * * *